US011042043B1

(12) United States Patent
Ginocchio

(10) Patent No.: US 11,042,043 B1
(45) Date of Patent: Jun. 22, 2021

(54) FOLDABLE READING GLASSES

(71) Applicant: Mark H. Ginocchio, St. Petersburg Beach, FL (US)

(72) Inventor: Mark H. Ginocchio, St. Petersburg Beach, FL (US)

( * ) Notice: Subject to any disclaimer, the term of this patent is extended or adjusted under 35 U.S.C. 154(b) by 0 days.

(21) Appl. No.: 15/918,615

(22) Filed: Mar. 12, 2018

Related U.S. Application Data

(60) Provisional application No. 62/469,559, filed on Mar. 10, 2017.

(51) Int. Cl.
  *G02C 5/00* (2006.01)
  *G02C 5/20* (2006.01)
  *G02C 5/22* (2006.01)

(52) U.S. Cl.
  CPC .............. *G02C 5/20* (2013.01); *G02C 5/006* (2013.01); *G02C 5/2209* (2013.01); *G02C 2200/06* (2013.01)

(58) Field of Classification Search
  CPC ........ G02C 5/006; G02C 5/20; G02C 5/2209; G02C 5/001; G02C 5/14; G02C 5/143; G02C 5/22; G02C 5/2254; G02C 5/2263; G02C 11/00; G02C 2200/08; Y10T 16/524; Y10T 16/526
  See application file for complete search history.

(56) References Cited

U.S. PATENT DOCUMENTS

| 7,513,617 | B1 * | 4/2009 | Alford | G02C 3/04 351/153 |
| 2006/0092373 | A1 * | 5/2006 | Gao | G02C 5/006 351/120 |
| 2007/0279580 | A1 * | 12/2007 | Breda | G02C 5/2263 351/115 |
| 2013/0155369 | A1 * | 6/2013 | Chen | G02C 5/006 351/115 |

FOREIGN PATENT DOCUMENTS

CN   1462896 A   12/2003

OTHER PUBLICATIONS

Photograph of foldable glasses; Nov. 30, 2016.

* cited by examiner

*Primary Examiner* — Jordan M Schwartz
(74) *Attorney, Agent, or Firm* — Wood Herron & Evans LLP

(57) ABSTRACT

Folding reading glasses of the type in which the temples fold around the lenses, in which the temples are supported and removably attached to the lenses while folded, providing greater integral strength to the entire assembly and resisting breakage. Several methods for attachment of the temples to the lenses are disclosed, including an interference fitting member in the temple that grasps the lens frame in the vicinity of the lens, and multiple embodiments of an interference fitting member in the temple that grasps a mating member on the outer edge of the lens frame. Combinations of these embodiments are also possible.

17 Claims, 8 Drawing Sheets

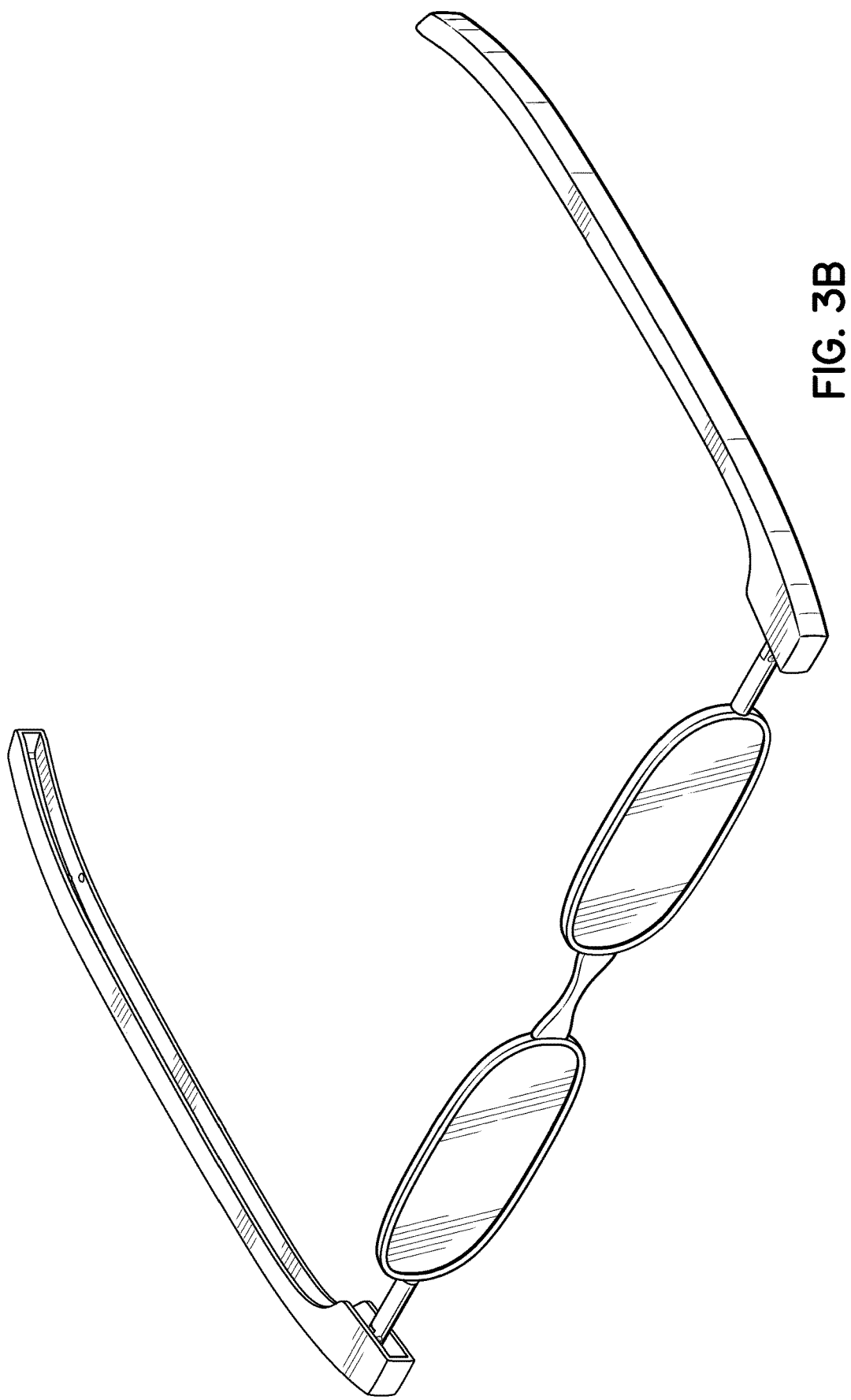

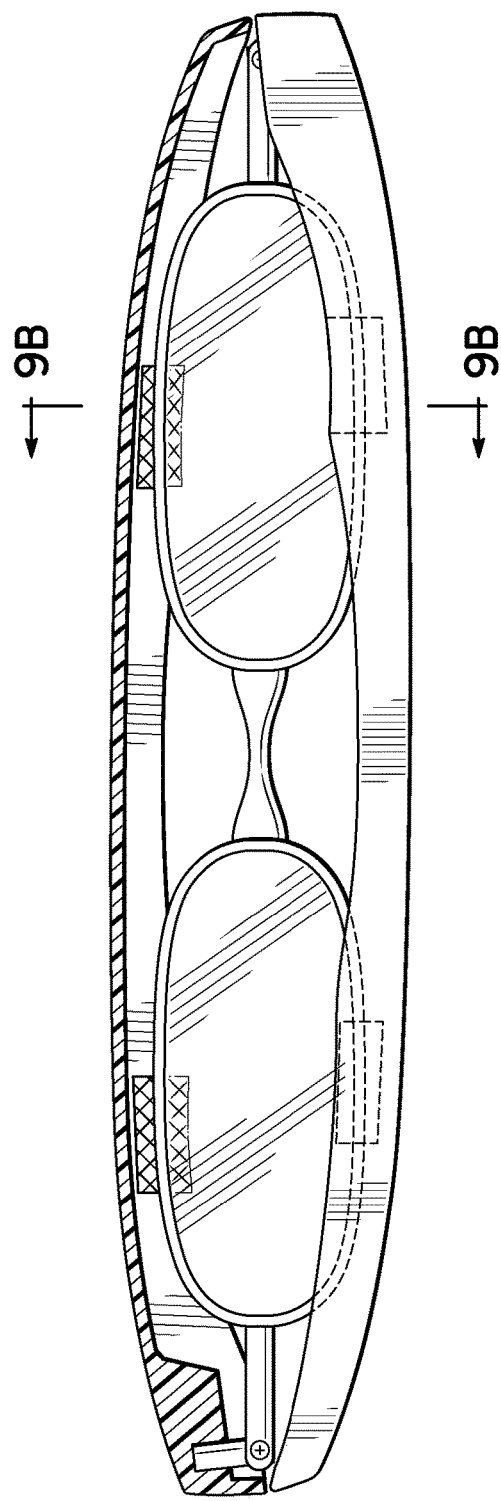
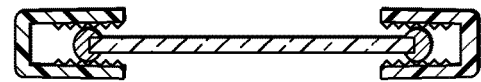
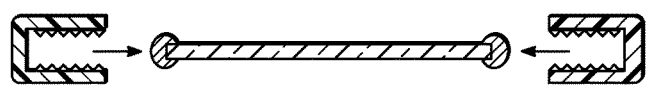
FIG. 8B
FIG. 9A
FIG. 9B

US 11,042,043 B1

FOLDABLE READING GLASSES

RELATED APPLICATION

This application is a U.S. non-provisional application claiming priority to provisional application U.S. Ser. No. 62/469,559 filed Mar. 10, 2017, which is incorporated herein in its entirety.

FIELD OF THE INVENTION

The present invention relates to foldable reading glasses.

BACKGROUND OF THE INVENTION

Reading glasses are used by many people who find they require a different prescription for reading or other close-up work, but prefer not to wear lenses in regular activity, or prefer not to wear bifocal lenses. However, reading glasses can be cumbersome to use, and difficult to store.

Recently, folding reading glasses of various types have been introduced, most notably folding glasses in which the temples fold around the lenses to form a reasonably compact unit when not in use. Unfortunately, the folded glasses are often fragile and easily broken, particularly if the temples are torqued or leveraged in the folded state, because they are only supported at the hinge with the lenses.

SUMMARY OF THE INVENTION

The present invention seeks to overcome these challenges with the prior art by providing folding reading glasses of the type in which the temples fold around the lenses, in which the temples are supported and removably attached to the lenses while folded, providing greater integral strength to the entire assembly and resisting breakage.

In disclosed embodiments, several methods for attachment of the temples to the lenses are disclosed, including an interference fitting member in the temple that grasps the lens frame near the lens, and multiple embodiments of an interference fitting member in the temple that grasps a mating member on the outer edge of the lens frame. Combinations of these embodiments are also possible.

The above and other objects and advantages of the present invention shall be made apparent from the accompanying drawings and the description thereof.

BRIEF DESCRIPTION OF THE DRAWINGS

FIG. 3A includes arrows showing the second step of unfolding of the temples by rotation of the temples relative to the lens frame;

FIG. 3B illustrates the folding reading glasses of FIG. 1 when fully unfolded from the position shown in FIG. 3A by rotation of the temples relative to the lens frame in the direction shown by the arrows in FIG. 3A;

FIG. 8B is an illustration of the folding reading glasses of FIG. 8A with the temples fully folded about the lens frame with the knurled temple surface engaged to the lens frame;

FIG. 9A is a cross section of the embodiment of FIG. 8A taken along lines 9A-9A In FIG. 8A, in which the temples not yet engaged to the lens frame, showing the interior knurled surface of the temples and the direction of motion to engage the temples to the lens frame; and FIG. 9B is a cross section of the embodiment of FIG. 8B taken along lines 9B-9B of FIG. 8B showing the engagement of the knurled surface of the temples with the lens frame.

Figure 1:
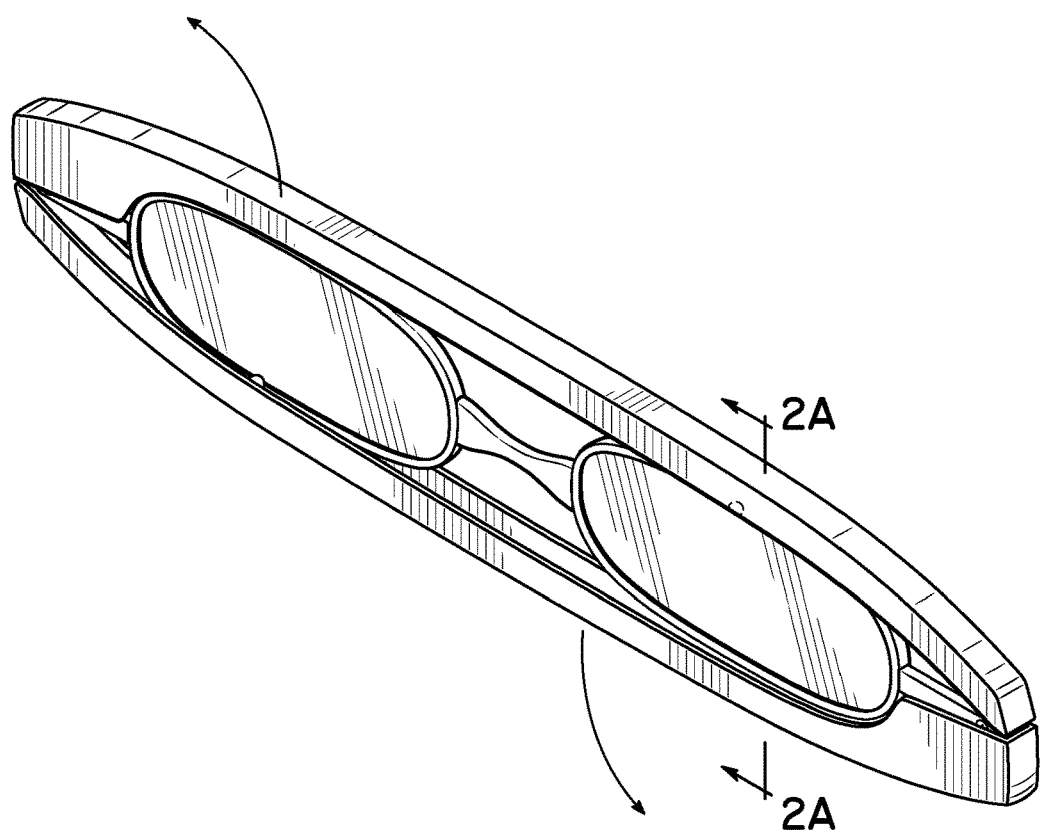
FIG. 1 illustrates folding reading glasses according to principles of the present invention, in a folded condition.
Figure 2A:
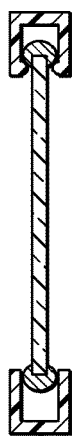
FIG. 2A is a cross section of the folding reading glasses of FIG. 1 taken along lines 2A-2A of FIG. 1, showing the interference fitment between the temples and lens frame which secures the temples in the folded position.
Figure 2B:
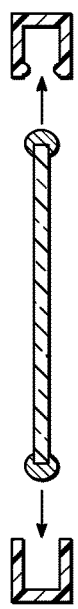
FIG. 2B is a cross section of the folding reading glasses of FIG. 1 showing the temples released from the lens frame when the reading glasses are unfolded in the directions shown by the arrows in FIG. 1 and FIG. 2B.
Figure 3A:
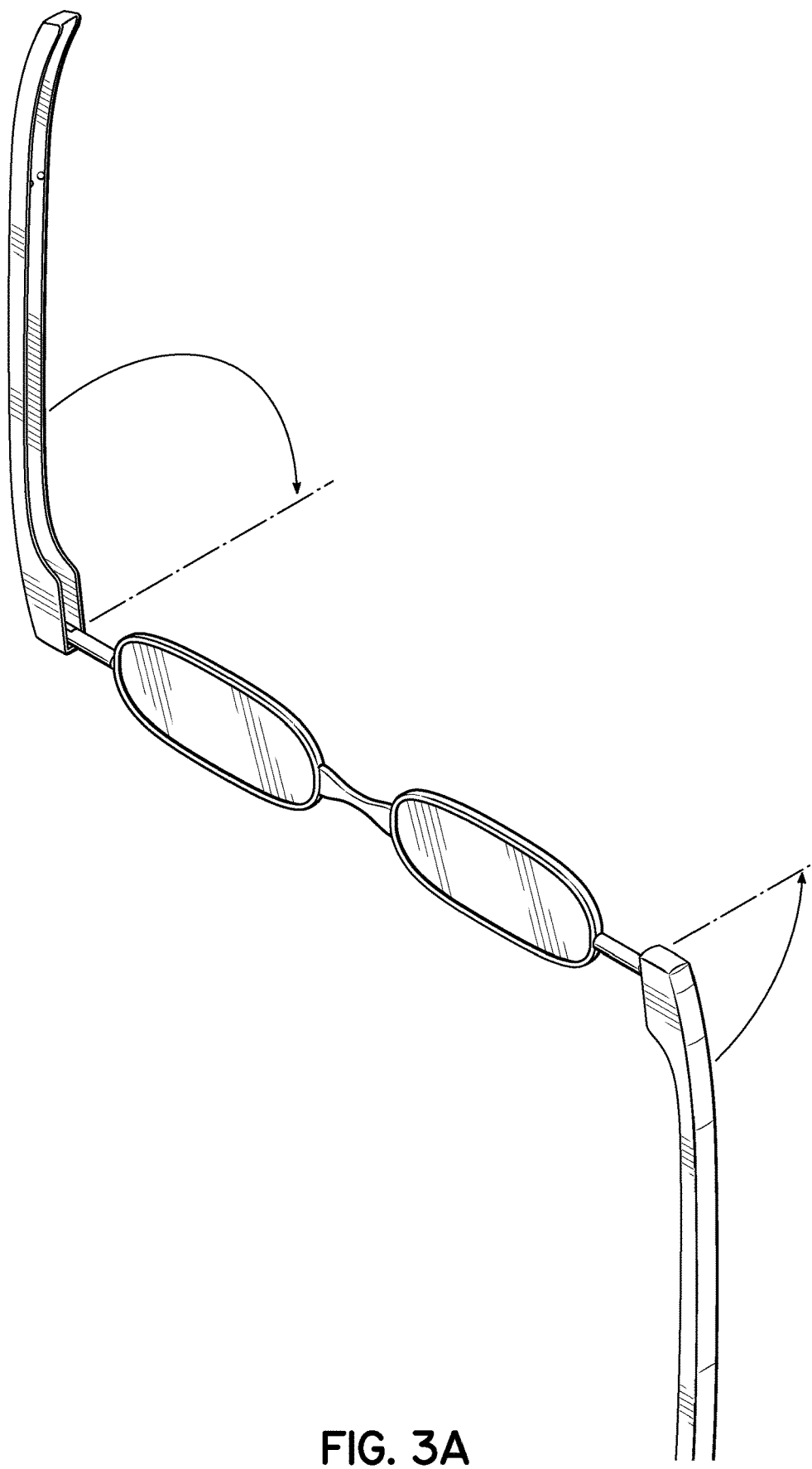
FIG. 3A illustrates the folding reading glasses of FIG. 1 in which the temples are fully unfolded from the lens frame.
Figure 4A:
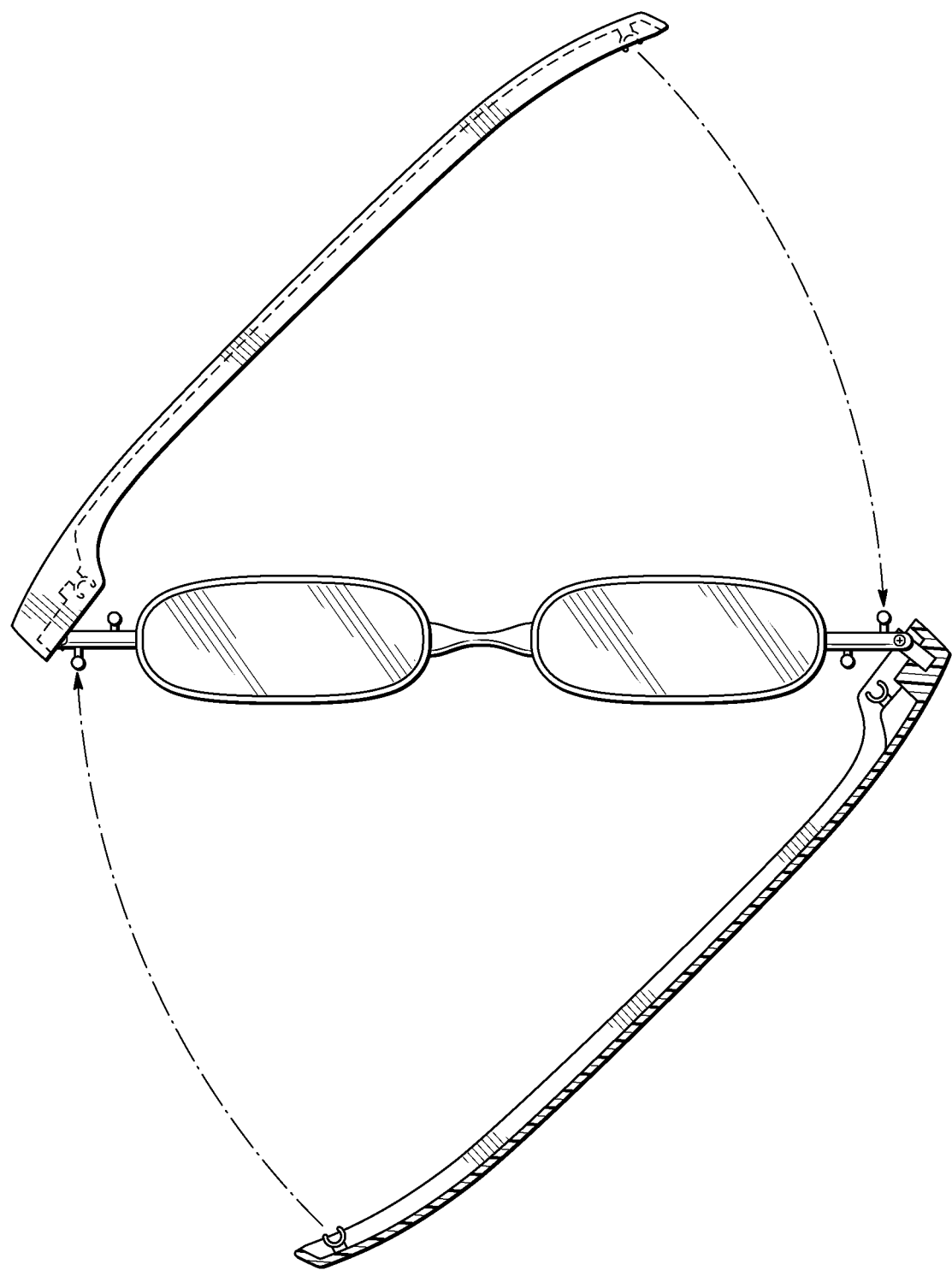
FIG. 4A illustrates an alternative embodiment of the folding reading glasses according to principles of the present invention, in which the temples are affixed to the lens frame using interference fit ball and socket couplings between the temple and outer areas of the lens frame.
Figure 4B:
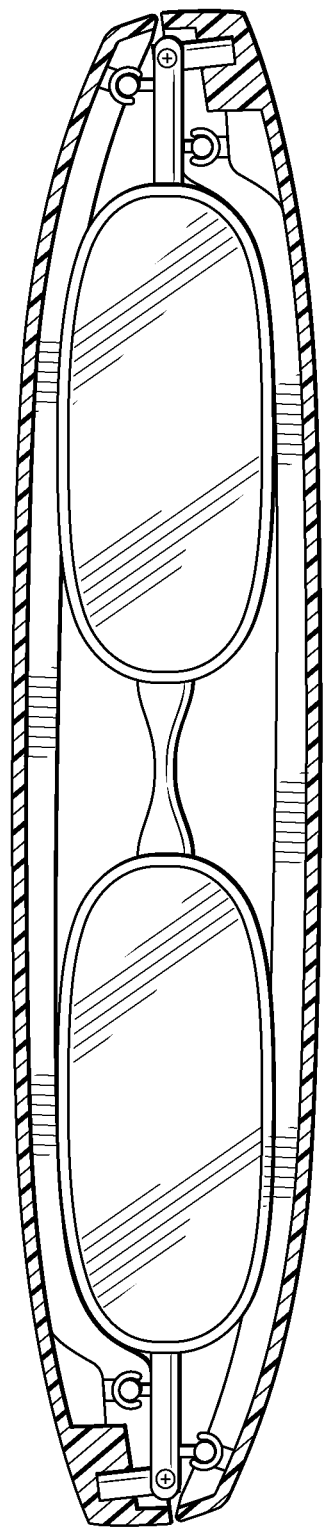
FIG. 4B illustrates the folding reading glasses embodiment of FIG. 4A where the temples are fully folded around the lens frame in the direction of the arrows shown in FIG. 4A, and coupled to the lens frame by the ball and socket couplings.
Figure 5:
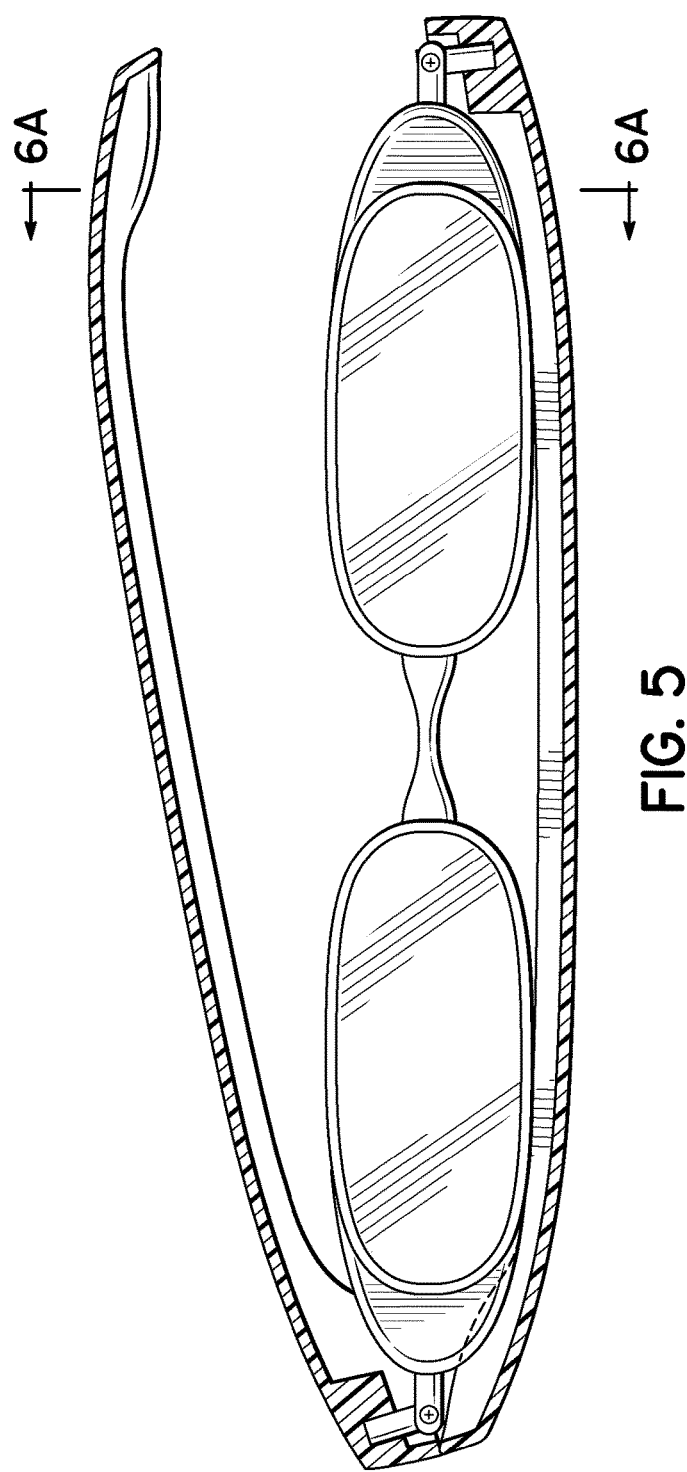
FIG. 5 illustrates a second alternative embodiment of the folding reading glasses according to principles of the present invention, in which the temples are affixed to the lens frame using an interference fit between a surface on an outer area of the lens frame (which may be ridged, knurled or toothed) and an interior area of the temple (which may have one or several engagement features)
Figure 7B:
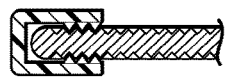
FIG. 7B is a cross section view of the embodiment of FIG. 7A after the temple has been fitted to the lens frame and snapped into place.
Figure 7A:
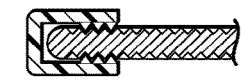
FIG. 7A is a cross sectional view similar to FIG. 6A, showing an alternative embodiment of a temple and lens frame, where the temple contains several engaging teeth and the lens frame is formed with a knurled surface which may be engaged by the teeth of the temple.
Figure 6B:
FIG. 6B is a cross sectional view of the embodiment of FIG. 6A after the temple has been fitted to the lens frame and snapped into place.
Figure 6A:
FIG. 6A is a cross sectional view of the embodiment of FIG. 5 taken along lines 6A-6A of FIG. 5, showing a version of the temple which has a single engagement rim, which creates an interference fit with a version of the lens frame having a compatible engagement rim.
Figure 8A:
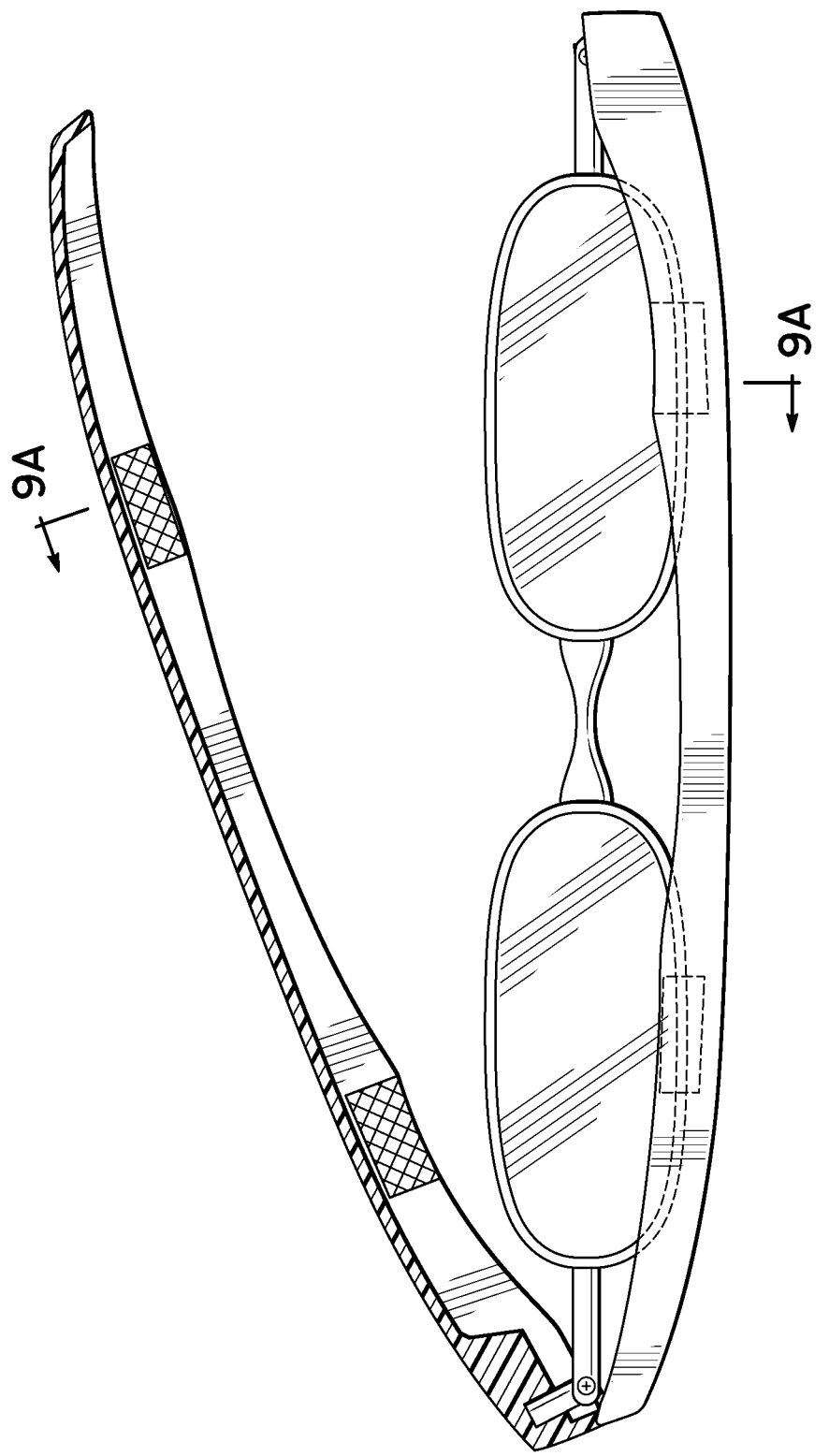
FIG. 8A illustrates a third alternative embodiment of the folding reading glasses according to principles of the present invention, in which the temples are affixed to the lens frame using a knurled surface on the interior of the temple which engages to the lens frame adjacent to the lenses.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

As can be seen in the drawings, the present invention provides folding reading glasses in which the temples fold around the lenses and are supported and engaged and removably attached to the lenses while folded. The invention thus provides the folded temples with greater integral strength and resists breakage.

The several methods for attachment of the temples to the lenses disclosed herein are merely exemplary, there being other methods for attachment which are equally effective for attaching the temples to the lens frame either near the lens or the outer edge or central area of the lens frame. Combinations of such engagement methods including the disclosed embodiments or alternatives are also possible and within the scope contemplated herein.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. Folding glasses of the type including two temples and a lens frame carrying optical lenses, wherein the lens frame includes a central nose bridge and outer temple couplings for attachment to the temples, and defines two openings for the optical lenses which hold the lenses such that the lenses extend between the bridge and the outer temple couplings,
   wherein each respective temple is attached to the lens frame at an end of a temple coupling by a respective temple coupling, and the temple couplings permit the temples to rotate into a common plane with the lens frame and fold in that common plane about the top and bottom surfaces of the lens frame while remaining attached to the lens frame, and wherein
   at least one the temples incorporates an engagement structure spaced away from both ends of the temple, the engagement structure attaching a temple to the lens frame without contacting either lens and with an interference fit in an area either protruding from an outer temple coupling or between the outer temple couplings and the central nose bridge and the area is spaced away from both temple couplings when the temple is folded against the top or bottom surface of the lens frame.

2. The folding glasses of claim 1 wherein a second temple incorporates an engagement structure attaching the temple to the lens frame when the second temple is folded against the top or bottom of the lens frame.

3. The folding glasses of claim 1 wherein the engagement structure is a toothed surface on an interior of the temple.

4. The folding glasses of claim 1 wherein the engagement structure is knurled surface on an interior of the temple.

5. The folding glasses of claim 1 wherein the engagement structure of the temple engages to the lens frame in the vicinity of a lens.

6. The folding glasses of claim 1 wherein the engagement structure of a temple comprises first and second engagement structure which engages to the lens frame in the vicinity of the first and second lenses, respectively.

7. The folding glasses of claim 1 wherein the engagement structure of the temple engages to the lens frame in an area outside of the lenses.

8. The folding glasses of claim 1 wherein the engagement structure comprises a socket, and the lens frame incorporates a ball for engagement to the socket.

9. The folding glasses of claim 1 wherein the engagement structure comprises a ball, and the lens frame incorporates a socket for engagement to the ball.

10. The folding glasses of claim 1 wherein the lens frame incorporates an engagement rim.

11. The folding glasses of claim 10 wherein the engagement structure comprises a rim for engagement with the engagement rim of the lens frame.

12. The folding glasses of claim 10 wherein the engagement structure comprises a toothed surface for engagement with the engagement rim of the lens frame.

13. The folding glasses of claim 10 wherein the engagement structure comprises a knurled surface for engagement with the engagement rim of the lens frame.

14. The folding glasses of claim 1 wherein the lens frame incorporates a knurled surface.

15. The folding glasses of claim 14 wherein the engagement structure comprises a rim for engagement with the knurled surface of the lens frame.

16. The folding glasses of claim 14 wherein the engagement structure comprises a toothed surface for engagement with the knurled surface of the lens frame.

17. The folding glasses of claim 14 wherein the engagement structure comprises a knurled surface for engagement with the knurled surface of the lens frame.

* * * * *